(12) United States Patent
Feeney et al.

(10) Patent No.: US 8,689,331 B2
(45) Date of Patent: Apr. 1, 2014

(54) MALWARE DETECTION

(75) Inventors: Bryan Feeney, London (GB); Steven Poulson, London (GB); John Edwards, London (GB)

(73) Assignee: ScanSafe Limited, London (GB)

( * ) Notice: Subject to any disclaimer, the term of this patent is extended or adjusted under 35 U.S.C. 154(b) by 532 days.

(21) Appl. No.: 12/636,599

(22) Filed: Dec. 11, 2009

(65) Prior Publication Data

US 2010/0162400 A1 Jun. 24, 2010

Related U.S. Application Data

(60) Provisional application No. 61/122,989, filed on Dec. 16, 2008.

(30) Foreign Application Priority Data

Dec. 11, 2008 (GB) .................................. 0822619.3

(51) Int. Cl.
*G06F 21/00* (2013.01)

(52) U.S. Cl.
USPC ........................................................ 726/24

(58) Field of Classification Search
None
See application file for complete search history.

(56) References Cited

U.S. PATENT DOCUMENTS

| | | |
|---|---|---|
| 4,975,950 A | 12/1990 | Lentz |
| 5,278,901 A | 1/1994 | Shieh et al. |
| 5,319,776 A | 6/1994 | Hile et al. |
| 5,440,723 A | 8/1995 | Arnold et al. |
| 5,448,668 A | 9/1995 | Perelson et al. |
| 5,485,575 A | 1/1996 | Chess et al. |
| 5,623,600 A | 4/1997 | Ji et al. |
| 5,675,711 A | 10/1997 | Kephart et al. |
| 5,696,822 A | 12/1997 | Nachenberg |
| 5,826,013 A | 10/1998 | Nachenberg |
| 5,832,208 A | 11/1998 | Chen et al. |
| 5,983,348 A | 11/1999 | Ji |
| 6,021,510 A | 2/2000 | Nachenberg |
| 6,212,510 B1 | 4/2001 | Brand |
| 6,279,113 B1 | 8/2001 | Vaidya |
| 6,298,445 B1 | 10/2001 | Shostack et al. |
| 6,405,318 B1 | 6/2002 | Rowland |
| 6,449,723 B1 | 9/2002 | Elgressy et al. |
| 6,622,150 B1 | 9/2003 | Kouznetsov et al. |
| 6,851,057 B1 | 2/2005 | Nachenberg |

(Continued)

FOREIGN PATENT DOCUMENTS

| | | |
|---|---|---|
| EP | 1760620 | 3/2007 |
| EP | 1760620 A2 | 3/2007 |

(Continued)

OTHER PUBLICATIONS

M. Zubair Shafiq, et al., "Embedded Malware Detection using Markovian Statistical Model of Benign Files", http://nexginrc.org, Aug. 19, 2008, XP002573983.

(Continued)

*Primary Examiner* — Michael R Vaughan (57) ABSTRACT

The invention provides methods and systems for detecting exploits. A received file is examined to determine whether or not it corresponds to any of one or more predetermined models of normal file types. If the received file does not correspond to any of the one or more predetermined models of normal file types, it is flagged as a potential exploit.

18 Claims, 4 Drawing Sheets

(56) References Cited

U.S. PATENT DOCUMENTS

| | | |
|---|---|---|
| 6,981,280 B2 | 12/2005 | Grupe |
| 7,089,591 B1 | 8/2006 | Chi |
| 7,130,981 B1 | 10/2006 | Nachenberg |
| 7,209,883 B2 | 4/2007 | Nefian |
| 7,546,471 B2 * | 6/2009 | Phillips et al. ............... 713/188 |
| 7,574,742 B2 * | 8/2009 | Yang et al. ...................... 726/24 |
| 7,639,714 B2 * | 12/2009 | Stolfo et al. .................. 370/474 |
| 7,664,754 B2 * | 2/2010 | Shipp .............................. 726/24 |
| 8,087,079 B2 * | 12/2011 | Ben-Itzhak ..................... 726/22 |
| 8,151,117 B2 * | 4/2012 | Hicks ............................ 713/187 |
| 8,191,146 B2 * | 5/2012 | Di Crescenzo et al. ......... 726/24 |
| 8,272,057 B1 * | 9/2012 | Dubrovsky et al. ............. 726/23 |
| 8,353,040 B2 * | 1/2013 | Tahan et al. ..................... 726/24 |
| 2003/0023865 A1 * | 1/2003 | Cowie et al. ................... 713/200 |
| 2003/0065926 A1 | 4/2003 | Schultz et al. |
| 2005/0027686 A1 * | 2/2005 | Shipp .............................. 707/3 |
| 2006/0015630 A1 | 1/2006 | Stolfo et al. |
| 2006/0037080 A1 | 2/2006 | Maloof |
| 2006/0161984 A1 * | 7/2006 | Phillips et al. .................. 726/24 |
| 2007/0038637 A1 | 2/2007 | Taneja et al. |
| 2007/0094734 A1 * | 4/2007 | Mangione-Smith et al. ... 726/24 |
| 2007/0152854 A1 | 7/2007 | Copley et al. |
| 2007/0240222 A1 * | 10/2007 | Tuvell et al. .................... 726/24 |
| 2007/0300300 A1 * | 12/2007 | Guo et al. ........................ 726/23 |
| 2008/0127336 A1 * | 5/2008 | Sun et al. ........................ 726/22 |
| 2009/0254992 A1 * | 10/2009 | Schultz et al. .................. 726/24 |
| 2010/0095380 A1 * | 4/2010 | Fossen et al. ................... 726/24 |
| 2010/0107251 A1 * | 4/2010 | Kudallur et al. ................ 726/22 |
| 2013/0104235 A1 * | 4/2013 | Fossen et al. ................... 726/24 |

FOREIGN PATENT DOCUMENTS

| | | |
|---|---|---|
| EP | 1971102 | 9/2008 |
| EP | 1971102 A1 | 9/2008 |
| EP | 1986120 | 10/2008 |
| EP | 1986120 A1 | 10/2008 |
| WO | 2005047862 A2 | 5/2005 |
| WO | WO 2005/047862 | 5/2005 |
| WO | 2007100915 A2 | 9/2007 |
| WO | WO 2007/100915 | 9/2007 |
| WO | 2008068459 A2 | 6/2008 |
| WO | WO 2008/068459 | 6/2008 |

OTHER PUBLICATIONS

International Search Report and Written Opinion issued in PCT/GB2009/002852, Mar. 23, 2010.
Combined Search and Examination Report issued in UK Patent Application No. GB0921587.2, Mar. 24, 2010.
Search and Examination Report for Application No. GB0921587.2; dated Mar. 24, 2010.
International Search Report and Written Opinion for PCT Application No. PCT/GB2009/002852; dated Apr. 6, 2010.
M. Zubair Shafiq et al., "Embedded Malware Detection using Markovian Statistical Model of Benign Files", TR-nexGINRC-2008-14; Aug. 19, 2008.
Chan, P. et al. "A Machine Learning Approach to Anomaly Detection." Florida Institute of Technology. Technical Report (2003).
Ghahramani, Z. et al. "Factorial Hidden Markov." Machine Learning. 29: pp. 245-273 (1997).
Gonchigar, S. et al. "ANI vulnerability: History repeats." SANS Institute Reading Room. <http://www2.sans.org/reading_room/whitepapers/threats/1926.php>.
Hirschberg, D. S. "Algorithms for the Longest Commom Subsequence Problem." Journal of the Association for Computing Machinery. vol. 24, No. 4: pp. 664-675 (1977).
Munson, A. et al. "Cluster Ensembles for Network Anomaly Detection." In North East Studeitn Colloquium on Ariticial Intelligence (NESCAI), 2006.
Rabiner, L. R. et al. "An Introduction to Hidden Markov Models." ASSAP Magazine, IEEE (see also IEEE Signal Processing Magazine). 3 (1 Part 1): pp. 4-16 (1986).
Gusfield, D. "Algorithms on Strings, Trees, and Sequences: Computer Science and Computational Biology." USA: Cambridge University Press. Chapters 7.4 (p. 125) & 7.9 (p. 135); [1997] (1999). ISBN: 0-521-58519-8.

* cited by examiner

MALWARE DETECTION

CROSS REFERENCE TO RELATED APPLICATIONS

This application claims the benefit of U.S. Provisional Patent Application No. 61/122,989, filed on Dec. 16, 2008 and convention priority of British Patent Application No. 0822619.3, filed on Dec. 11, 2008, the entire contents of which are incorporated herein by reference.

FIELD OF THE INVENTION

This invention has to do with methods, systems and computer programs for detecting 'malware' (i.e. malicious software), often referred to as computer 'viruses'. It is particularly concerned with detecting files crafted to exploit weaknesses or vulnerabilities in specific applications, so as to execute machine-code instructions. Files containing such malicious software/code are referred to in the following as "exploits".

BACKGROUND

Viruses have presented a threat to computing devices for over twenty years. A virus is a malicious program which can propagate itself, and which can optionally perform malicious acts on the host device.

The manner of propagation has led to various sub-divisions: a standard virus is one which is embedded within a file—executable or not—and which on execution or access by an executable, inserts a copy of itself into other files and/or performs an action on the host device. A virus which is not embedded, but is rather the totality of the file, albeit disguised, is called a trojan. A virus which propagates itself by exploiting server, rather than end-user, software, is called a worm.

The arrival of the Internet has led to an explosion in the scale of viral threats and infections. Where once the risk a user would encounter a virus—let alone be infected by it—was minimal, today it is a certainty that any computer user on the Internet will encounter a virus, and the only question is whether they have deployed counter-measures which are sufficient to protect them from the viral attack.

The standard counter-measures employed by users have not changed in over twenty years. Before access by an application or operating system component, the contents of the file are examined to see if they match any one of a plurality of viruses stored in a database.

The point of scan has changed over time. Initially files were scanned as applications were loaded into memory (as described e.g. in U.S. Pat. No. 4,975,950). However as viruses have begun to spread over the Internet, the target of scans has moved to incorporate email and other network communications both on client devices and on intermediate network devices (see e.g. U.S. Pat. No. 5,319,776, U.S. Pat. No. 5,623,600, U.S. Pat. No. 5,832,208).

Typically files are examined for a specific subset of the viral code—the signature—which is invariant across all possible infections. This family of methods—involving a scan through a database of known exploits before access—is limited in several ways.

The first problem is storing the virus signature definitions: an ostensibly simple problem that has grown in magnitude as the number of viruses and their variants has exploded, and which has led to significant work such as that described in U.S. Pat. No. 6,622,150.

The second problem, arising from this, is the difficulty in examining each file for every individual example of a virus stored. The use of traditional methods is no longer possible and this in turn has led to many innovative, though complex, solutions (e.g. U.S. Pat. No. 6,021,510, U.S. Pat. No. 6,981,280, U.S. Pat. No. 7,130,981) which seek to expedite the process of scanning a data-stream for the thousands of viruses and virus variants currently known to exist.

The third problem is that it is necessary to update the virus signature definitions on a regular basis, so that established counter-measures can react to new threats (see e.g. U.S. Pat. No. 6,298,445). Repeated updates can cause significant logistical issues, both in terms of upstream bandwidth, and aggregate bandwidth on the client side. Furthermore, there is an ever-present risk to the client arising from the period of time that occurs between a virus surfacing and updated counter-measures (such as a new virus signature) being developed; and the subsequent period of time between the completion of updated counter-measures, and the client receiving those updates. This period of time leaves the client vulnerable to attack.

Attackers have taken advantage of this, generating new viruses, or modified versions of existing viruses on a regular basis. Consequently there is now a race between security vendors developing and deploying counter-measures, and attackers generating new viruses, and new versions of existing viruses. This has led to a fourth problem: protecting clients from new or unseen viruses.

Solutions to this fourth problem have been developed, and can be broken into four areas: script inspection, executable inspection, 'honeypots' and polymorphism detection. The first three seek to detect novel exploits on receipt of a file, whereas the latter seeks to detect minimally identifiable information in advance which will allow all variants of a single exploit, including unseen variants, to be discovered. These will be discussed separately.

Scripts are files that contain instructions to be executed by another executable. Examples include the JavaScript and VBScript interpreters built into web-rendering components found in web-browser and email applications; and the macro systems found in office suites such as Microsoft Office and OpenOffice. As the individual instructions are available for inspection, systems and methods have been developed which seek to identify instructions—or sequences of instructions—which seek to perform malicious acts, or access vulnerable resources (such as the information stored on the device). One such example is U.S. Pat. No. 7,089,591, which examines macro scripts for known viral patterns and attempts by the script to "break out" of the limited environment in which such scripts are expected to execute.

Such methods require techniques to be manually developed for the specific language in question, and require the implementer to exhaustively list all the attack vectors by which a viral infection may establish itself.

Executable inspection seeks to examine the construction of a binary executable file—such as a Java class, an ActiveX control, or a machine-code executable—for indications that it may seek to alter crucial system resources. Examples of this include U.S. Pat. No. 5,983,348, which inspects system calls in ActiveX and Java executables before execution, and instruments them to monitor behaviour during run-time; and U.S. Pat. No. 6,449,723 which inspects system calls in advance of execution to ensure that they do not seek to access resources prohibited under a specific arbitrary policy.

As with script inspection, these methods require the developer to learn the structure of the file, and the potential attack vectors, himself.

A 'honeypot' is a resource made publicly available to attack, but carefully scrutinised so that when an attack occurs it is immediately detected. With regard to novel virus detection, 'honeypots' involve storing data about the file to detect alterations, as described, for example, in U.S. Pat. No. 5,448,668 and U.S. Pat. No. 5,440,723. When an alteration is discovered, careful examination of the file can be used to detect the characteristics of the virus, and so infer a signature which can be used by traditional virus scanning methods subsequently. 'Honeypot' techniques are frequently used in Intrusion Detection Systems.

As a significant number of new viruses are nothing more than variations on a small core of exploits, work has been undertaken to find single, unique signatures which are common to a family of viruses. The need for this is particularly acute as there now exists so-called polymorphic viruses, which can alter themselves between infections (e.g. by encrypting a significant portion of their body using simple techniques such as XOR). Significant work (see e.g. U.S. Pat. No. 5,696,822, U.S. Pat. No. 5,826,013, U.S. Pat. No. 6,851,057, U.S. Pat. No. 5,485,575) has been carried out in the creation of techniques to scrutinise such viruses in a controlled environment, and automatically infer the unique identifying features of such viruses, which, it is intended, will detect unseen variations of said viruses. In practice however, such methods are frequently defeated by different payload-encapsulation methods.

In the modern era, such methods have proved insufficient. The speed of viral development has increased dramatically, and the methods outlined above have struggled to compete.

Some work has been carried out on developing machine-learning methods to detect generic characteristics of viruses which allow new viruses to be detected, most notably U.S. Pat. No. 5,675,711. This method uses a corpus of infected and non-infected binary executable files, and trains a binary neural-network classifier to distinguish between the two. This method is limited however in that it only targets binary executable files, and requires examples of infected and non-infected files. The use of infected files additionally increases the risk that the classifier trained will only recognise variants of the existing infections, instead of new infections.

An extra problem with the method outlined above, and indeed with most of the methods outlined so far, is that they only target scripts and executable files. In the modern era, virus developers have constructed so-called drive-by attacks. These attacks make use of vulnerabilities in viewer applications or operating system components (such as web-browsers, PDF viewers, movie viewers, etc.) to construct files which, when loaded, trigger an invalid state which leads to machine-code embedded within the file to be executed. These machine-code fragments typically then download and execute an executable file from a remote location—it is this file which delivers the payload as it were. An example of such an attack is the recent animated cursor vulnerability [Gonchigar 2007].

SUMMARY OF THE INVENTION

It is a general aim of embodiments of the present invention to detect an exploit by comparing a file with one or more models of normal files and to determine that the file is abnormal, and hence (at least potentially) an exploit, if it does not correspond to one of these models.

This approach represents a clear departure from the prior art and brings with it significant advantages as it is able to detect previously unseen exploits (e.g. viruses); it is not reliant on the exploit having a known 'signature' because the comparison is with known, normal file-types as opposed to known abnormal file-types. It follows that the models used in the present invention can be trained using only normal files, avoiding many of the problems of the prior art discussed above.

In a first aspect, the invention provides a method of detecting exploits, the method comprising:

receiving a file;

determining whether or not the received file corresponds to any of one or more predetermined models of normal file types; and if the received file does not correspond to any of the one or more predetermined models of normal file types, flagging the received file as a potential exploit.

In a second aspect, the invention provides a system for detecting exploits, the system comprising:

a memory for receiving a file;

a database storing one or more models of normal file types; and a processor, the processor being operable to determine whether or not a file received in the memory corresponds to any of one or more predetermined models of normal file types stored in the database and if the received file does not correspond to any of the one or more predetermined models of normal file types, to flag the received file as a potential exploit.

Embodiments of the invention can be used with or incorporated into, e.g., an intrusion detection system, virus filtering or virus scanning application or apparatus, in order to detect and subsequently control access to a suspect file (i.e. a file identified as a potential exploit). The invention may be implemented, for instance, at a client device or in a network device and may, for example, be incorporated in a managed network (e.g. internet) security service.

In the aspects of the invention set forth above, the step of determining whether the received file corresponds to a predetermined model of a normal file type may comprise segmenting the file into two or more segments and determining whether each of the segments corresponds to the model of a segment of a normal file type.

The files, or where applicable, each file segment, may be modelled as a sequence of integer values. For each file type, the structure governing the file's (or each segment's) content may be inferred by a machine learning system. The structure may be hierarchical or flat.

The modelled file types may be or include non-executable file types.

The models of normal file types (or file type segments) are preferably probabilistic models, whereby the output from the determining step is a probability that the received file is of a given normal file type. The probabilistic model for a given file type is preferably trained using a corpus of normal files of that type.

The models may, for example, be Markov models (e.g. Factorial Hidden Markov Models or Hidden Markov Models).

Where the model is a Hidden Markov Model, the model may be trained using the Expectation Maximisation model. Where the model is a Factorial Hidden Markov Model (with two latent variables), the training can be performed by the Expectation Propagation algorithm or by Gibbs Sampling (as discussed in [Ghahramani 1997]). Whatever training method is used, in either case, the subsequent classification of received files can be carried out by way of the forward algorithm or the Viterbi algorithm.

In the case where the model is a probabilistic model, the determining step may comprise comparing the output probability that a received file is of a given type with a threshold probability. The threshold probability may be specific to a given model and may, for instance, be determined based on the probabilities output by the model for a corpus of normal files (e.g. those used to train the model). For example, the threshold may be set at the mean of the probabilities output for the normal files, plus or minus a predetermined number of standard deviations.

Typically there will be models for a plurality of different file types. The number of file-types is not bounded, and may extend from one single file-type, to one hundred, or even more. A typical deployment may contain models for up to thirty file-types of special interest.

Whilst it may be possible to compare a received file with all of the available models of normal file types, for expediency it will generally be preferred to initially determine a short list of possible file types and to make the comparison only with the models for these short listed file types. File types may be shortlisted, for example, based on file name extension or file mime-type. Additionally or alternatively, it may be possible to short list possible file types from the file content, for instance based on patterns of byte-sequence values found to be associated with particular file types.

The step of flagging the received file may comprise flagging the file as normal, possibly infected (i.e. a possible exploit) or definitely infected (i.e. a definite exploit).

In another aspect, the invention provides a software application comprising computer program code that when installed and executed on a computer or computer system causes the computer or computer system to operate in accordance with the method of the first aspect above.

Other optional and preferred features of the various aspects of the invention are discussed in the detailed description below.

BRIEF DESCRIPTION OF THE DRAWINGS

The invention is described below with reference to the accompanying drawings, in which.

DESCRIPTION OF EMBODIMENTS

Overview

Embodiments of the present invention are generally concerned with a method that allows for the detection of novel viruses in non-executable files: in particular (although not necessarily exclusively), hand-crafted file content designed to trigger vulnerabilities in a software application (e.g. web-browser, PDF viewer, etc.) or operating system component which will lead—directly or indirectly—to the execution of machine-code instructions.

In general, in the embodiments described in more detail below, we model the contents of a type of file (a "file-type") as a sequence with one or more latent Markov properties, of arbitrary order, which represent the structure of the file, and which can be combined with probability distributions conditioned on the state of those Markov variables to model the file's contents. This is known as a Factorial Hidden Markov Model [Ghrahramani 1997], though in the case of a single Markov chain, it reduces to a standard Hidden Markov Model. We infer a given file-type's structure within this probabilistic framework, and then use this model to infer the normality of the content of a file of that type. This measure of a file's normality is used by a decision engine to determine if the file is likely to be an exploit.

In some embodiments, again as described in more detail below, a heuristic is used to accelerate the inference of a file-type's structure within the framework of a Hidden Markov Model and a Factorial Hidden Markov Model.

Introduction

In a little more detail, we have developed novel methods and systems which can detect exploits, including exploits in non-executable files such as those described in the background section above.

In stark contrast to the prior art methods, the approach taken by embodiments of the present it) invention does not rely for its effectiveness on known examples of infected files: rather it uses probabilistic techniques to develop a model of what a file should normally contain (i.e. a model of a 'normal' file), and uses this probability model to detect outliers, i.e. files that are not normal.

This approach proposed by the present inventors is effective because exploits in non-executable files tend to rely on abnormal file content to e.g. trigger an invalid state in a viewer; additionally, the hand-crafted construction of the file and the presence of machine-code segments lead it to stray from the norm. Hence a file which is not probable (i.e. does not fit with the probability model of a normal file of that type) is likely to be a virus.

In preferred embodiments of the invention, a file is modelled as a series of one or more segments. Each segment is modelled as a sequence of integer values. For each possible file-type, the structure governing each segment's contents is inferred by a machine learning system. In some embodiments the structure may be hierarchical, so that a particular value at a particular point in a segment depends on two or more structural variables. In other embodiments the structure may be flat, so that a particular value at a particular point in the segment depends only on a single structural variable.

Segmentation schemes, where used, may be specified manually by the developer. Typically, most files will not in fact be segmented, in which case the entire file's structure is inferred. Where the file is segmented (e.g. JPEG images with optional metadata blocks) segmentation is performed manually, and the structure of the individual segments is inferred.

In the embodiments described in more detail below, the structure of a file is inferred in the context of a particular probabilistic model termed a Factorial Hidden Markov Model, which consists of one or more "hidden" Markov chains, encapsulating the structural variables and the probabilities of moving from one part of the structure to the next, and several probability distributions conditioned on the current state(s) of the structural variable(s) which govern the particular integer value observed at a point in the file or segment's structure. In the case of a flat structure, where only one Markov chain is used, the model reverts to a Hidden Markov Model.

The system uses a novel heuristic to construct a prototype model to be trained, which experts in the field term an informative prior, to expedite the training process. An optimisation strategy based on longest common sub-sequences to optimise training performance and to help capture long-range correlations in data is used. This provides an alternative to other methods in the field, such as the use of entropic priors (see e.g. U.S. Pat. No. 6,212,510).

In execution, the system uses a rapid-lookup mechanism, identifying byte-sequence values associated with a plurality of file-types in conjunction with several heuristics to rapidly select a shortlist of plausible file-types for a particular file, which in some embodiments functions in the absence of file-name or file mime-type information. For each type in this short-list, the probability of the file being of that type is then inferred using the method described in the preceding paragraphs.

The system uses these per-file-type threshold-probabilities in conjunction with a decision function to infer, give the probability of a file's content output from a model, whether the file is normal, is possibly infected, or is definitely infected. Such decisions can then be used in conjunction with an overall intrusion-detection, virus-filtering or virus scanning apparatus to control access to the file (e.g. the information may be used to determine if a file should be deleted, quarantined, passed to the client with a warning, or passed to the client without a warning).

Probabilistic Models

The use of probabilistic models to detect outliers is typically called "anomaly detection", and such techniques have been used in the past in academic research into Intrusion Detection Systems. Such methods are applied to network traffic, rather than the files transmitted by network traffic, and take advantage of the developer's pre-existing knowledge about the structure of such traffic to identify features that can then be classified using, for example, clustering or rule-learning techniques [Munson 2006, Chan 2003]

However as with script and executable inspection, these methods require pre-existing knowledge of the structure of network transmission, and in particular rely heavily on the fixed and simple nature of network transmission structure, as opposed to the more flexible, complex and repeating structure commonly found in file formats. In practice, most applied work in intrusion detection is still based on the idea of 'honeypots' (U.S. Pat. No. 5,440,723) and pattern (i.e. signature) recognition techniques applied to network traffic (U.S. Pat. No. 5,278,901, U.S. Pat. No. 6,279,113, U.S. Pat. No. 6,405,318).

In contrast to these prior art applications for probabilistic models, the methods proposed by the present inventors do not assume pre-existing structure of the file-type. To cater for this, we use factorial hidden Markov models [Ghahramani 1997] (FHMMs) to automatically infer the hierarchical structure of the file-type in a probabilistic model, which can then be used to detect anomalies, in the manner described in more detail below.

It should be noted that a Factorial Hidden Markov Model with a single hidden Markov chain reduces to a simple Hidden Markov Model [Rabiner 1986] (HMM), and as an optimisation, a system may choose to use the somewhat simpler inference algorithms associated with Hidden Markov Models in such cases.

HMMs, and latterly FHMMs have been applied to the fields of speech recognition (e.g. U.S. Pat. No. 7,209,883) and image recognition, but this is the first time that they have been applied to the problem of inferring file structure, particularly with a view towards anomaly detection and novel virus detection.

DETAILED DESCRIPTION

The detailed discussion below of embodiments of the invention is broken down into four parts. In the first part we discuss segmentation. In the second part we discuss the probability model in detail, and the algorithms for performing inference on that model. In the third part we discuss the method of model creation and training, and the heuristics employed by that method. In the final part we discuss the file classification process, in which models are selected and executed to infer the probability of the file being of a particular type, and the decision function used to output a discrete outcome based on those probabilities.

Segmentation

In most cases a file's format is fixed. However some types of files contain various optional segments in optional order: the resulting file can be thought of as a meta-file containing multiple embedded files which in aggregation represent the totality of the data. Examples of this include: MP3 files which may contain some or all of ID3v1 and ID3v2 metadata segments, identifying the artists, song etc., in addition to the binary music stream; JPEG files which may contain ICC colour profiles, EXIF metadata identifying camera and date details, XMP Metadata listing transformations and others in addition to binary image data; PNG files which similarly may contain ICC and metadata ("iTXT") segments; and movie container files such as WMV which may contain metadata and binary data in one of several different formats.

Extracting these embedded "micro-files" is called segmentation, and the micro-files themselves are called segments. Thus while for most files (e.g. animated cursor files, WMF files, etc.) the method infers the structure of the file as a whole, for files with optional embedded segments (e.g. JPEG, PNG, MP3 and WMV files), the system represents the file as a collection of segments, and the method infers the structure, of each of these segments. The segmentation is explicitly specified by the developer.

Probabilistic Model for File-Type Structure

In the following, unless otherwise stated, we will use the term "file" to refer to an actual file, or a segment within a file, as described hitherto.

Files do not necessarily have to reside on disk, they may be reconstituted in memory from a network communication.

For the purposes of performing inference, a sample of bytes from the start of the file is converted to a sequence of integers. The size of the sample is determined in training, as described in the next section.

In one embodiment, the sequence of integers has a one-to-one correspondence with the raw bytes of the file, being a sequence of values between 0 and 255 of the same length as the number of bytes in the sample. In another embodiment, a sequence of integers is generated by reading two bytes at a time to form a value between 0 and 65536, and moving one byte forward at each iteration (leading to an overlap of bytes read). In general the system provides for user-defined variation between the number of bytes read for each integer in the sequence (the word-size) and the number of bytes by which the system moves through the file before reading in the next integer value (the step-size).

In addition to these methods, a third embodiment involves mapping of variable-length byte-sequences to individual integer values, a process known as tokenization, using a manually specified dictionary mapping variable-length byte sequences to their integer values.

Our model posits that there is a latent, higher-order, structure governing the generation of values observed in this sequence. Moreover, we posit that there is a temporal dependence in our model: viz. that the state of the structural variable(s) changes as we progress through the sequence.

A standard model used to model temporal sequences with latent variables is the Hidden Markov Model (HMM), which models sequence values as being generated by a number of so-called emission probability distributions conditioned on a latent multinomial variable with a Markov property. Recent work has extended the traditional Markov Model so that there can be more than one latent Markov chain: such models have been termed Factorial Hidden Markov Models (FHMMs). It is possible to estimate the posterior distribution (i.e. "train") these models using Expectation Propagation, sampling techniques such as Gibb's Sampling, or by generating an equivalent Hidden Markov Model with a single Markov Chain and using the Expectation Maximisation algorithm.

Figure 4:
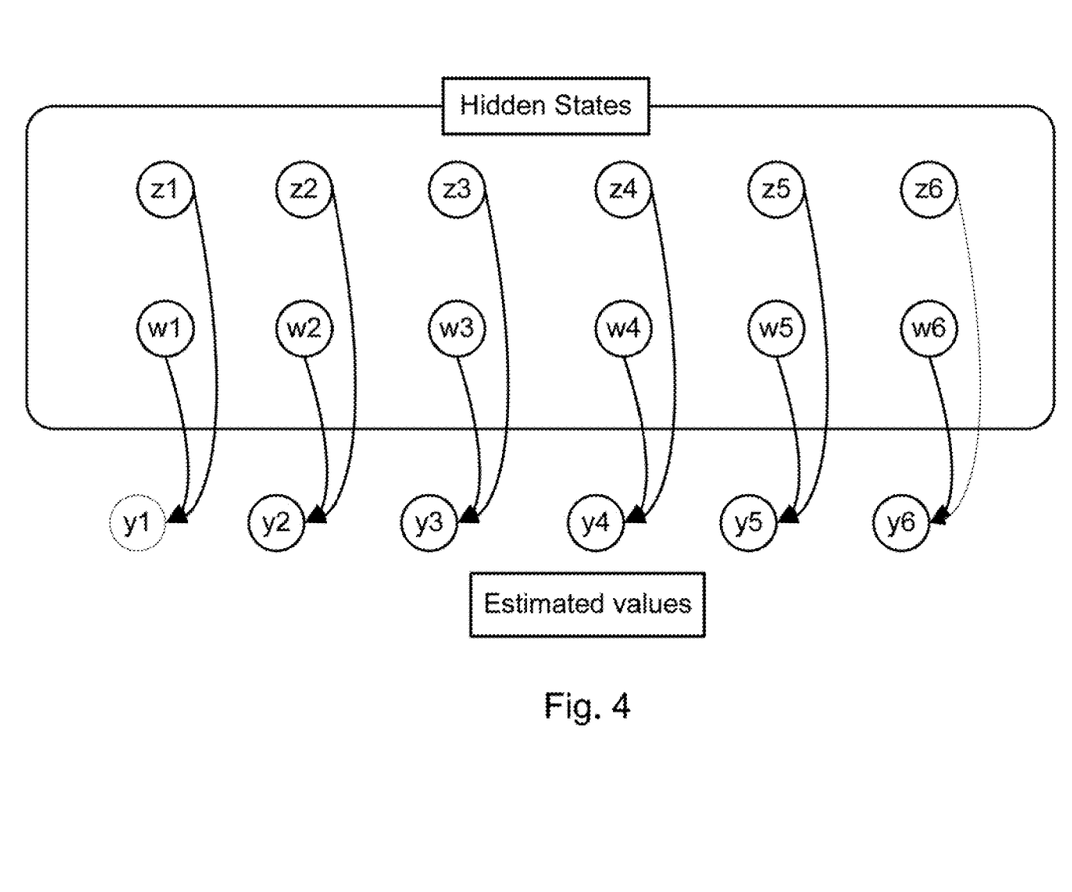
FIG. 4 is a schematic illustration of a Factorial Hidden Markov Model with two internal Markov chains.

FIG. 4 illustrates an FHMM with two latent Markov chains. To describe the mathematical components of a Factorial Hidden Markov Model, we shall first start with the simpler case of the standard Hidden Markov Model. In this model, the joint probability of an observation, $y_t$ and state $s_t$ at time t (or at a position, t, in a sequence) is $$P(\{s_t, y_t\}) = P(s_0)P(y_0|s_0)\prod_{\tau=1}^{t} P(s_\tau|s_{\tau-1})P(y_\tau|s_\tau)$$

where $P(s_0)$ is the probability of the system starting from state s; and $P(s_t|s_{t-1})$ is the probability of transitioning to state $s_t$ having previously been in state $s_{t-1}$, and $P(y_t|s_t)$ is the "emission" probability of seeing the observed value $y_t$ when the hidden chain is in state $s_t$. The state is a single multinomial variable which can take one of K discrete values, implying that a K×K transition matrix is sufficient to model the transition probability distribution $P(s_t|s_{t-1})$. If the observables are discrete symbols taking on one of L values, the emission distribution $P(y_t|s_t)$ can be modelled by a K×L matrix. If the emission distribution is continuous, or if it is very large and requires approximation, other distributions can be used, such as the Guassian distribution, a mixture of Guassian distributions, or other functional approximation schemes such as, but not limited to, linear regression and neural networks. Alternately, one could seek to create a simple transition matrix, but store a compressed version, for example. by quantizing the probabilities. For the purposes of illustration, in the case of a conditional mixture of Guassians, the distribution $P(y_t|s_t)$ would be modelled as $$P(y_t|s_t) = \sum_{m=1}^{M} w_m(s_t) \times N(y_t; \mu(m), \sigma(m))$$

where M is the total number of component distributions in the mixture, $\mu(m)$ and $\sigma(m)$ are the mean and standard deviation of the distribution respectively, and weighting parameter w(m) is the probability P(M=m|s) that the observable was generated by mixture component m conditioned on the current state s.

The Factorial Hidden Markov Model extends this initial model by conditioning the observations on more than one hidden states, effectively converting s from a scalar to a vector parameter. Each dimension of the state vector $s^{(d)}$ may take $K_d$ values, In order to ensure the model is tractable, we assume the dimensions of the state vector are independent of one-another, i.e.

$$P(s) = \prod_{d=1}^{D} P(s^{(d)})$$

Where D is the dimensionality of the state vector (i.e. the number of latent markov properties, or "chains"). Consequently $$P(s_t|s_{t-1}) = \prod_{d=1}^{D} P(s_t^{(d)}|s_{t-1}^{(d)})$$

This new state distribution can be plugged into the existing HMM framework, without any further changes to the underlying mathematical structure, though clearly inference becomes significantly more challenging.

Model Training System and Optimisations

The training of the system is broken into three sections:
1. Identifying recurring byte-strings in the files' segments to aid in training
2. Identifying recurring byte-strings in initial bytes of the files overall to aid in file-type detection
3. Constructing a prototype model and training it based on the patterns extracted in step (1)

Identifying Recurring Byte-Strings (Steps 1 & 2)

For steps one, and two we employ the Longest Common Sub-string (LCS) algorithm (Gusfield, Dan [1997] (1999). Algorithms on Strings, Trees and Sequences: Computer Science and Computational Biology. USA: Cambridge University Press. ISBN 0-521-58519-8), which is not to be confused with the Longest Common Subsequence algorithm. As part of the algorithm, we compute the longest common suffix for all pairs of prefixes of strings. The longest common suffix for strings S and T of length p and q respectively is defined as $$LCSuff(S_{1 \ldots p}, T_{1 \ldots q}) = \begin{cases} LCSuff(S_{1 \ldots p-1}, T_{1 \ldots q-1}) + 1 & \text{if } S[p] = T[q] \\ 0 & \text{otherwise} \end{cases}$$

For the sample strings "ABAB" and "BABA" this results in a table such as that shown below. Note that we leave boundaries before and after the words, with all entries set to zero by default.

|   |   | A | B | A | B |   |
|---|---|---|---|---|---|---|
|   | 0 | 0 | 0 | 0 | 0 | 0 |
| B | 0 | 0 | 1 | 0 | 1 | 0 |
| A | 0 | 1 | 0 | 2 | 0 | 0 |
| B | 0 | 0 | 2 | 0 | 3 | 0 |
| A | 0 | 1 | 0 | 3 | 0 | 0 |
|   | 0 | 0 | 0 | 0 | 0 | 0 |

From analysis of this table, we can identify sub-strings. These will occur a number on a table is less than the number in the table cell above and to the left of it. The number in that upper left cell, is the length of the sub-string found, and its index can be found by subtracting the length from the column index of the cell in question. The addition of a boundary at the end of the input strings allows us to determine sub-strings at the end of the input strings.

Note that whereas the original algorithm sought to find the longest sub-string, we seek to find all sub-strings whose length is greater than a certain value (e.g. 4 characters). Further, as we only need the previous rows content to do this, we do not have to store the entire table in memory, only the current and previous rows.

We use this method to detect the longest common sub-strings in the file. The input strings are not the raw file-contents, rather they are the sets of integer values generated from the file contents.

For reasons of efficient these strings are stored in a particular tree-structure known as a Trie (a reTRIEval Tree). This is a tree structure with one node per character, which allows for the efficient storage of several strings, using an implicit prefix code. At the leaves of the Trie, denoting the ends of individual strings, we store the average index in the sequence where the strings have been found, and the number of times the strings have been found. For further efficiency, a compressed or "Patricia" Trie is typically used.

Having found all sub-strings common to all pairs of files in the corpus, we then seek to extract from them a minimal set of -sub-strings, such that no sub-string in the set is itself a sub-string of any other sub-string.

The process is as follows:
1. A new Trie is created for results.
2. The first available string, hereafter called the probe, and its associated data, is removed from the input trie.
3. A search is performed of the input to find the first string which shares at least one sub-string with the probe string, using the longest-common sub-strings method described earlier
4. If no such pattern is found, the probe is added to the list of results
5. If such a pattern is found, the following steps take place
    i. All common sub-strings are removed from the probe, and added to the input. Their average offset and frequency in the file are computed from the probe and matching string's information.
    ii. All remaining sub-strings from the probe are added to the input, with appropriate offset and frequency information.
    iii. The matching string is removed from the input list.
    iv. All common sub-strings are removed from the matching string
    v. All remaining sub-strings from the matching string are added to the input, with appropriate offset and frequency information.
6. If the input Trie is empty, return the result Trie, else jump to (2) and repeat Empirically it has been observed that trimming leading and trailing zero values from such strings is beneficial, as zero-bytes are often used as padding. Additionally, it may be necessary to re-scan the input files to correct rounding-errors in the offset and frequency calculations. Once frequency information has been calculated, it can be used to select a certain short-list of strings used to initialise the model.

The strings read in for each segment are also used to determine the number of bytes to sample from that segment during classification and training, being set to the sum of the position of the last sub-string found, the length of the last sub-string found, and the average length of a gap between sub-strings, with appropriate conversion from integer sequence size and raw byte-size within the underlying file.

For the purposes of file-type detection, this process is performed on the unsegmented overall file, on raw bytes instead of integers generated from bytes, and the resulting list of byte-sequences is stored alongside the description of the file-type. Byte-sequences which start at offset zero—sometimes called magic numbers—are stored in one of n arrays, where n is the size of the greatest byte-sequence length acceptable for a magic-number code. This information is used for file-type detection, as described further below.

Model Prototype Creation (Step 3)

One significant novel contribution to the field made by embodiments of the present invention is the use of character patterns extracted by repeated execution of an LCS algorithm to derive a prototype Hidden Markov Model (Factorial or Simple)—which may be considered an informative prior by those skilled in the art—which is used in training to accelerate convergence of the learning algorithm. This prototype allows for even simple Hidden Markov Models to capture long-range correlations in sequences; the failure to do so is an issue that often affects Hidden Markov Models. Additionally it acts as a useful optimisation in the training process, dramatically accelerating convergence.

The input is the set of common integer sub-strings found in the data, which have offset and frequency data associated with them. Typically the n most frequent such integer sub-strings, or patterns are used, where n is a tunable parameter of the algorithm.

The next steps depend on whether the model has one or two hidden Markov chains. We begin by considering the case of a model with one latent Markov chain With a single Markov chain, each hidden state corresponds to one or more positions in the input file. We start with an empty model, and for each pattern, add states to capture that pattern, and states to capture the content that typically follows those patterns.

For patterns, and in the trivial case, we create a single state in the model for every value in the pattern. For each of these states the emission distribution is configured so it is sharply peaked in the area of that particular value in the pattern. In one embodiment a discrete distribution is used, to with a high value probability $p_e$ set for the byte value and a uniformly low probability assigned to all other values. "High" in this context depends on the particular embodiment, in one case we have set it to 75%. It is important that it not be too high, to allow for flexibility in the posterior-density estimation process.

The transition probabilities for each state set the probability of moving to the next state to a high probability, $p_t$. The remaining probability mass is divided equally amongst all other possible transitions. The value of $p_t$ depends on the particular embodiment, typically it is set to a value around 75%.

Thus the most probable path through particular states representing a pattern is a straightforward progression from first to last, emitting the values in the byte-sequence.

We then add a number of states (called gap-states) after these pattern states to capture the probability distribution of those values seen after the pattern. The number depends on the embodiment: it may be fixed, or it may be prorated according to the number of values between the average offset of the current pattern in the file, and the average offset of the next pattern. The emission distributions between these gap states distribute the probability mass uniformly amongst all possible values. For each gap state, the probability of it transitioning back to itself is set to $$\frac{p_t}{2};$$

the probability of it moving forward to its immediate neighbour is set to $$\frac{p_t}{2};$$

and the probability of transitioning to any other state is set to $$\frac{1-p_t}{N-2}$$

where N is the total number of states in the model. The transition probability for the last of the gap states is configured to leap to the first of one of m subsequent byte-string state sequences, where m depends on the embodiment, and is typically set to 3 (except where less than m subsequent sequence-states exists). So for the last state in a sequence of gap-states, the probability of transitioning back to itself is $$\frac{p_t}{2},$$

the probability of it transitioning to each of the next three patterns is set to $$\frac{p_t}{2m},$$

and the remaining probability mass is divided equally amongst all other possible transitions.

It is generally preferable that the number of states added to represent patterns be held to some limit. In cases where the length of the pattern is greater than the number of states, the following simple algorithm is designed to set the ideal number of states to represent a pattern:

```
lastBest      = maxStatesPerPattern
lastBestError = maxStatesPerPattern
for i = maxStatesPerPattern..minStatesPerPattern:
    if lastBestError == 0:
        return lastBestError
    error = i - (numObservables mod i)
    if error < lastBestError:
        lastBestError = error
        lastBest      = i;
return lastBest
```

This should, if possible return the maximal number of states such that the final state will be configured to match the final value in a pattern, e.g. if the maximum number of pattern states is 5 and the minimum is 3, and a pattern is 6 values long, the ideal length is 3, which ensures that the last state encodes the last value (as well as the third value of course).

The transition probabilities for the last pattern state are altered to include the loop back to the start. If the last state encodes the last value in the pattern, the probabilities of moving to the first gap state, and of looping back to the first pattern state, are both set to $$\frac{p_t}{2}.$$

If the last state does not encode the last value in the pattern, its probability of moving back to the first pattern state is set to $p_t$ with all other state probabilities divided uniformly. The pattern which does encode the last value of the pattern has a probability of moving to the next pattern state, and of moving to the first gap state, set to $$\frac{p_t}{2}.$$

The remainder of the probability mass is divided equally among all other possible transitions.

The emission probabilities for each pattern are altered to take into account the various values in the pattern those states should match. Typically this involves setting the probabilities for those values to $$\frac{p_e}{n}$$

where n is the number of times one passes through that state while matching the pattern.

As currently discussed there has been no mention of the case where patterns overlap. In actuality this case is dealt with by the fact that prior transition probability, and the probability of transitioning from the end of each gap state-sequence to the next pattern state-sequence, is split to over m states as discussed earlier.

In the case where there are two Markov chains, such as found in a simple Factorial Hidden Markov Model the approach taken is similar. The first Markov chain can be thought of as representing the fields in the file and has one state per pattern. For each state, the probability of transitioning from one state to the next is set to a reasonably high value, $p_t^{(1)}$ with the probabilities of transitioning to all other states set to $$\frac{1-p_t^{(1)}}{N-1},$$

where $N_1$ is the number of states in this first Markov chain.

A second Markov chain is used to represent positions in the field. Its size is fixed beforehand, being an implementation detail of the embodiment, being equivalent to the maximum number of pattern and gap states to be used for any pattern. Transition probabilities are altered to provide a bias toward forward movement, but not to the same extent as in the single-Markov case, so that in this case $p_{t,2} \ll p_{t,1}$.

The same process used to configure the emission distribution P(y|s) in a model with a single Markov Chain is then used to configure the probability distribution $P(y|s_1,s_2)$ with two Markov chains, however instead of assigning probability values, the values are initialised to zero and then the augmented by $p_e$ for each emission, for each state, for each pattern. The resulting distributions are then normalised over the total number of patterns.

This prototype model can then be used with an appropriate posterior density estimation algorithm such as Expectation Propagation, sampling techniques such as Gibb's Sampling or in the case of a model with a single hidden Markov chain, Expectation Maximisation.

File Classification Process

The file classification process comprises three steps:
1. Identifying a short-list of probable file-types (FIG. 1);
2. Evaluating the probability of a file being of a particular type for each type in the short-list (FIG. 2); and
3. Using the probability values to arrive at a decision.

These will be described separately.

Heuristic File-Type Detection

Figure 1:
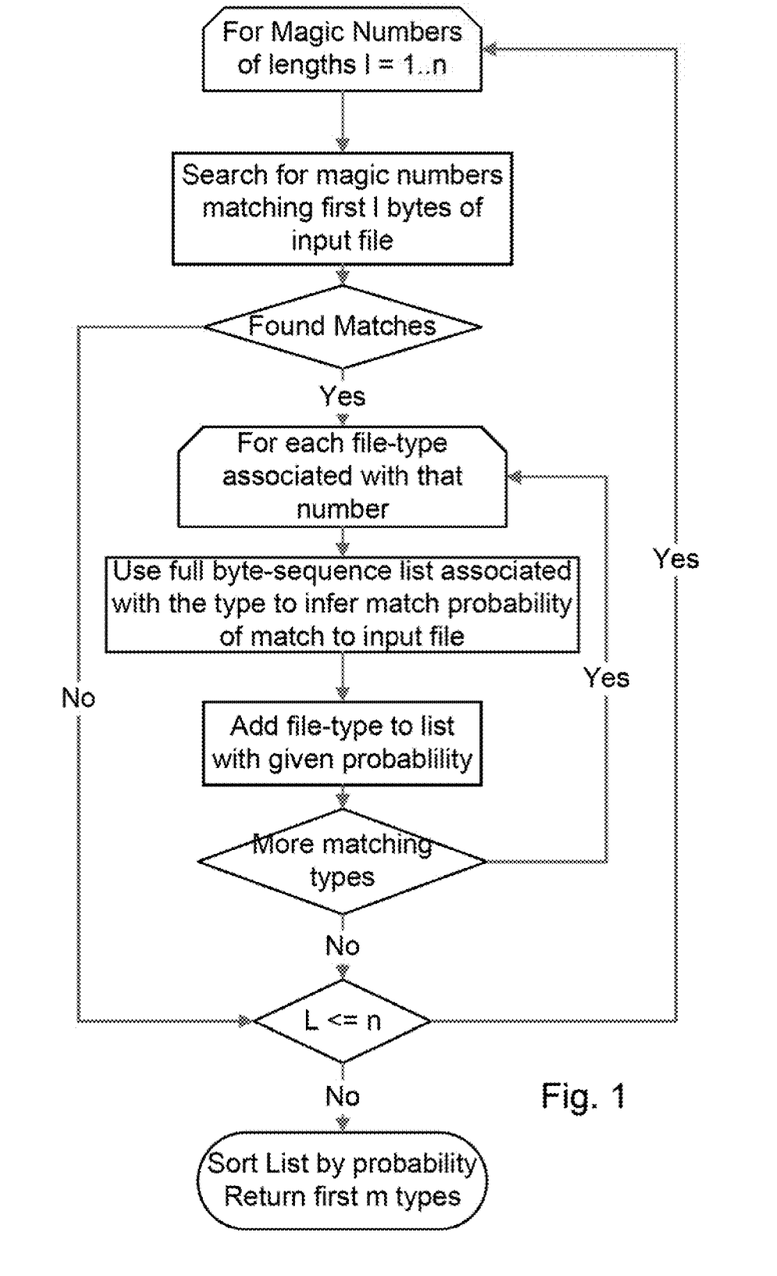
FIG. 1 illustrates a process, in accordance with an embodiment of the present invention, by which a file, which is represented as a simple sequence of bytes, is probabilistically matched to one or more candidate file-types.

Step one involves detecting the file-type from a file's contents. Optionally the file-name extension, the mime-type or both may also be used to determine (or aid in the determination of) file type. FIG. 1 illustrates this step.

In the basic case, which we will describe initially, we assume that mime-type and file-name information is unavailable.

In the following we will use the term magic-number to refer to a sequence of one or more bytes, always found at the start of a file of a particular type, by which the type of the file can be identified (a class of information sometimes termed in-band metadata). We will use the term pattern to refer to any sequence of one or more bytes typically, though not always, found within a file, which can aid in the identification of the file's type.

It follows therefore that a magic-number is just a special case of a pattern.

The system contains a database of n sorted tables of magic numbers. The first table consists of one-byte magic numbers, the second table consists of two-byte magic numbers and so on until the $n^{th}$ table consists of n-byte magic numbers. Each magic number entry in each table is matched to one or more file-type records, containing information about file-type(s) identifiable by that magic number.

On receipt of a file, a certain number of the files bytes are read into a stream. The following algorithm is then performed on the stream contents:

```
typesList = [ ]
for i in range(1, n):
    needle = substring (streamContents, 0, i)
    haystack = magicNumbers[i]
    match = binarySearch (hayStack, needle)
    if match < 0:
        continue
    fileTypes = magicNumberTypes[i][match]
    for type in fileTypes:
        prob = calcMatchProbability(streamContents, type)
        typesList.add (prob, type)
```

As can be seen, this simply performs a binary search through all possible magic number lists, finding the types that match, and adding them to a list with a given probability. In a typical embodiment, the list is sorted by probability, with most probable types being the first returned by a standard enumeration of the lists contents.

The probability of a given type matching a stream is calculated by performing a search for the patterns registered with a given file-type, using the Boyer Moore algorithm. In cases where it is known patterns always occur at a fixed offset, a simpler algorithm may be used. Patterns may match in whole, in part, or not at all.

An interim probability of matching is calculated by simply dividing the number of correctly matched bytes, across all patterns, divided by the total number of bytes in all patterns. In cases where patterns overlap, if one pattern matches, the other is not counted in the total. If neither match, the longer pattern is used in calculating the total length of all patterns.

In order to take the number of bytes to match into account (after all, matching one out of two bytes is less impressive than matching 10 out of 25), a null-probability is used to weight matches as follows:

$$Pr(TypeMatchesStream) = \frac{P_{type}(\text{stream})}{P_{null}(\text{stream})}$$

where $$P_{type}(\text{stream}) = \frac{N_{match}}{N_{total}}$$

$$P_{null}(\text{stream}) = \left(\frac{1}{N_{value}}\right)^{N_{total}}$$

where $N_{match}$ is the number of bytes that matched in patterns, $N_{total}$ is the total number of bytes that can match, as described earlier, and $N_{value}$ is the total number of possible values. In order to prevent a different problem, of partial matching to over specified file-types exceeding full matching to typically-specified file-types, we calculate the mean and standard deviation of $N_{total}$ across all possible file-types, set $N_{max\ total} = m_{total} + s_{total}$ and alter the definition of the null probability so that it is defined as $$P_{null}(\text{stream}) = \left(\frac{1}{N_{value}}\right)^{min(N_{total}, N_{max\ total})}.$$

This heuristic approach allows us to rapidly select and sort by likelihood of match a shortlist of possible file-types.

Once we have exhausted all possible magic numbers, we consider those few file-types for which no magic numbers are defined, and use the same process to calculate their probability and add them.

Where file-name and/or mime-type information is available, this can be used to immediately discard file-types which fail to match the extension or mime-type, thus avoiding costly probability calculations.

To avoid false-positives it is necessary to take into account typical mistakes in file-names or mime-types that occur, particularly on the Internet. This also helps avoid costly probability calculations.

While discarding types without due consideration carries risks, it is offset by the fact that virus writers will always supply the correct mime-type in network communications, or file-name extension in file-based viruses, so that the appropriate program whose vulnerabilities they seek to exploit are used to attempt to display the file.

Typically only a subset (e.g. the first five) of the matching file-types are used in the next stage, classification.

Classification

Figure 2:
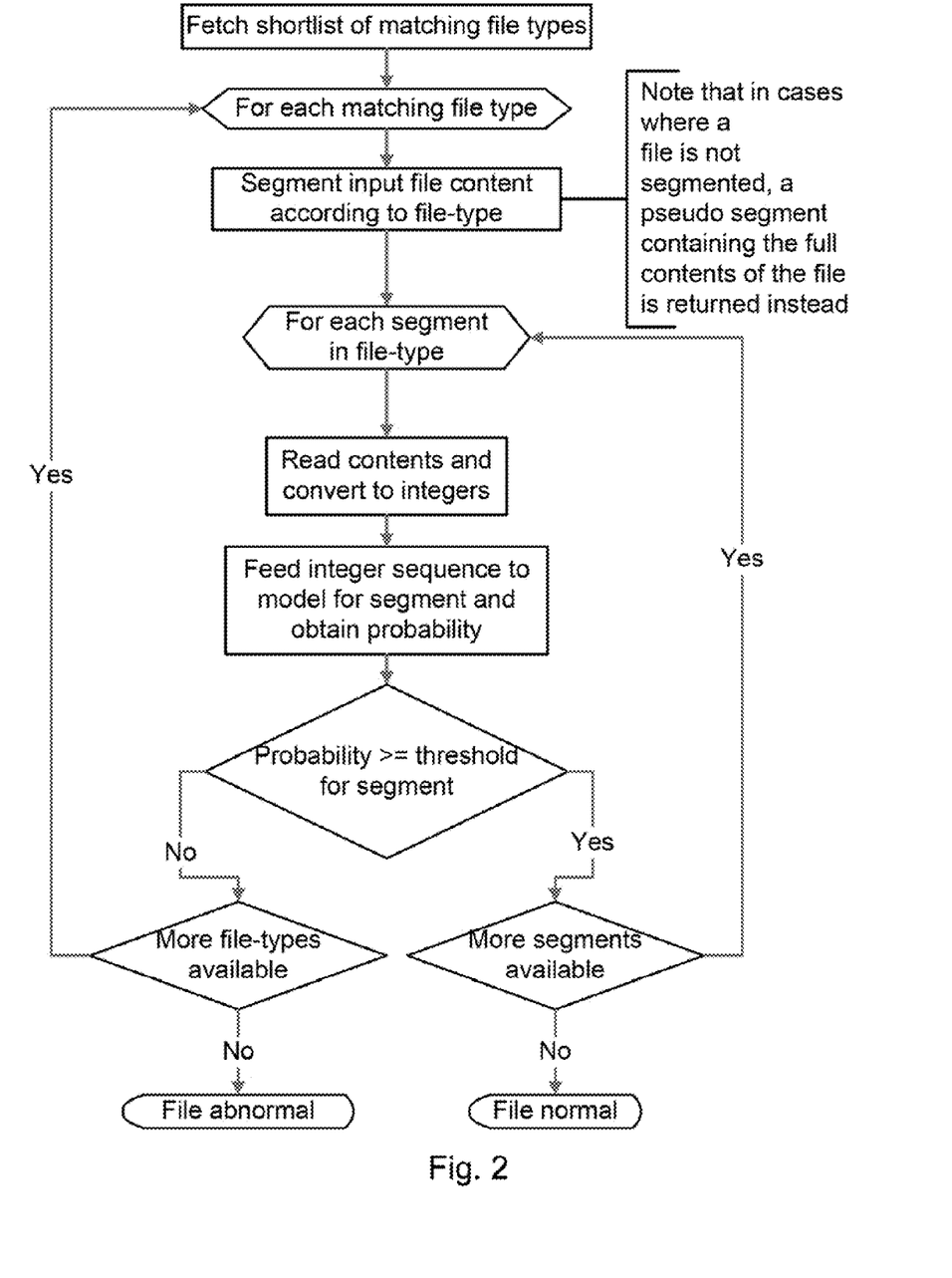
FIG. 2 illustrates a file classification process according to an embodiment of the present invention, featuring the file-type detection mechanism illustrated in FIG. 1.
Figure 3:
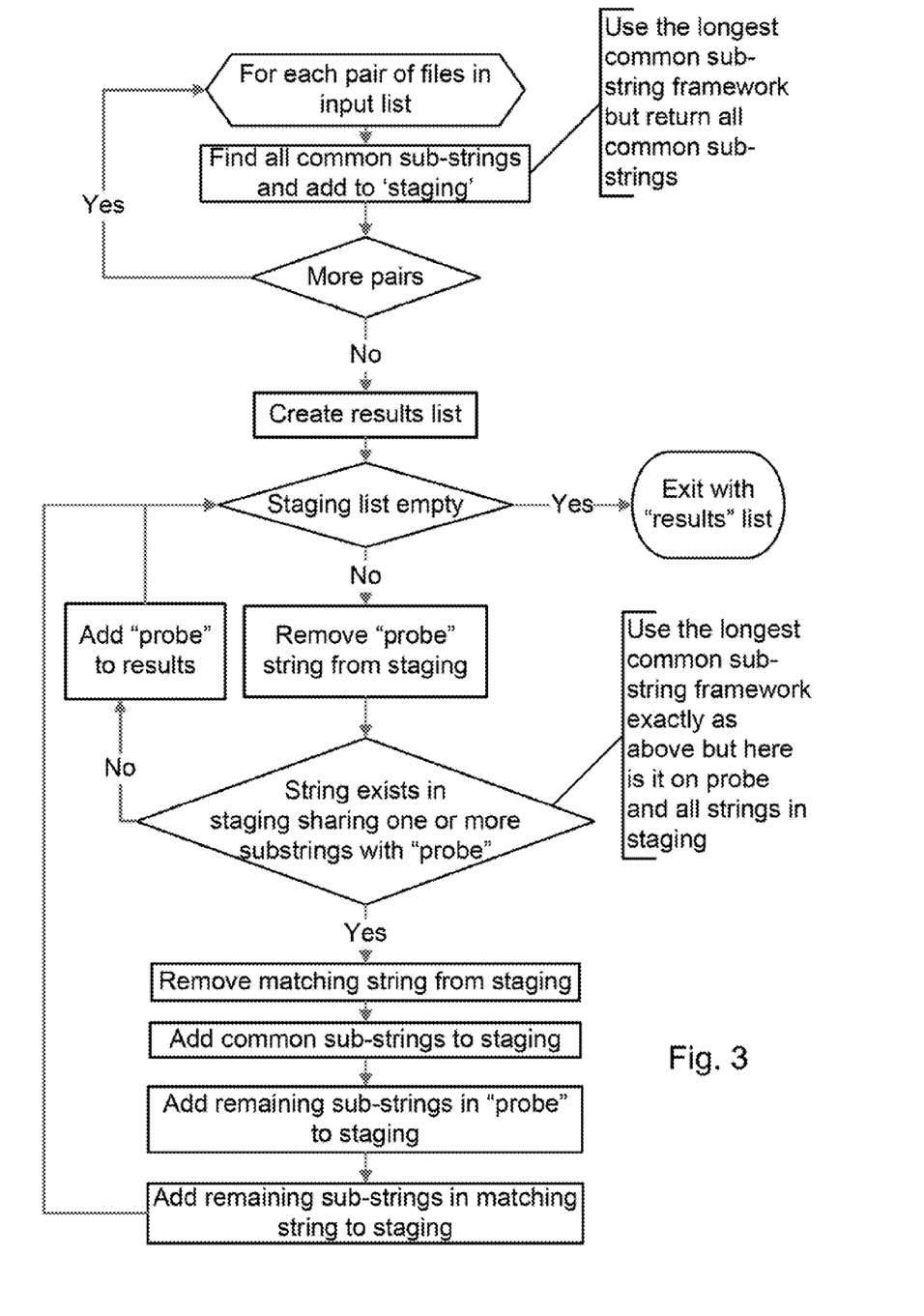
FIG. 3 illustrates a method used to detect recurring sub-strings in a series of files of a single type—these sub-strings can be used to heuristically create a prototype model—or informative prior—to expedite training of models used in embodiments of the present invention.

The classification process is summarised in FIG. 2.

Having selected a short-list of matching types, each type is considered in turn. For each type, a list of segments is extracted; for simple unsegmented types, a pseudo-segment representing the entire file is returned. For each segment of each file-type, the appropriate classifier is selected from the database of training classifiers. A classifier is a segmentation strategy. The segmentation strategy will determine how to segment the file, and contains evaluation logic for each segment. The evaluation logic for each segment is a trained model (as described earlier), a method of converting the segment's bytes to integers to be evaluated by that mode, and a threshold probability with which the probability output by the model can be compared.

The contents of the segment in the incoming file are converted to a sequence of integer values, as described hitherto, and then classified by the classifier using the forward algorithm.

The Viterbi algorithm may also be used in some embodiments: it provides a more accurate estimation of the probability, albeit at the expense of longer classification times.

An issue arises however, in that Hidden Markov Model methods implicitly assume sequences of fixed length. Sequences of shorter than expected length will result in a greater probability than sequences of expected length, which is the opposite result to that expected. To work around this, the natural log of the probability output by the model (often referred to as the log-likelihood) is divided by the square of the sequence length.

The resulting probability is stored in a record of classification results, which is then used by the final, decision stage.

Decision Process

The decision process effectively states that a file is abnormal if and only if for all matching file-types are least one segment is abnormal. This allows a fast-succeed decision process to be executed in the classification stage, which will cease further inspection and come to the decision that a file is normal if all segments of a particular type are deemed normal. The task therefore is to determine what constitutes an abnormal file.

The approach taken by embodiments of this invention is as follows. Having used a corpus of normal files in the training phase to estimate the posterior parameters of the model, the model is then used to classify all files, and the probability score for each of these normal files are recorded. The mean score is calculated, as is the standard deviation amongst all scores. A threshold is set at the mean minus a certain number of standard deviations, which in a typical embodiment is set to 2.7 standard deviations.

In subsequent use in the detection of exploits, should the probability of a file's contents (given the assumption that it belongs to a particular segment of file of a particular type) be less than this threshold, it is deemed abnormal, by the aforementioned assumptions of segment and type.

The segment or segments of a given file are compared in this manner with each of the short-listed file types. If all of the segments of the file are found to be within the respective thresholds for the segments of one of the short-listed file types, then the file is deemed a normal file (of that type) and the results for the other short-listed file types can be ignored. If, on the other hand, one or more of the file segments is outside the thresholds for each of the short-listed file types, then the file is deemed abnormal and appropriate action can be taken (e.g. deletion of quarantine of the file).

A pleasant consequence of this approach, is that having calculated the threshold, the files in the corpus (i.e. those use for training) can then be compared to the determined threshold. Should any of the files fall below this threshold, it may indicate that:

1. The file is not of the particular type ostensibly represented by the corpus (e.g. accidentally including a GIF file in a corpus of JPEG files);

2. The file is infected and/or anomalous; and/or

3. The model has failed to generalise due either to a limited number of sample files, limited variation within sample files, or both.

Thus the training process itself is robust in the face of shoddy or erroneous methods for the establishment of a corpus of files of a particular type, and furthermore can communicate to the developer the stability of the model. Such feedback can inform the choice of a single or double Markov chain in the "hidden" part of the model.

A second threshold can be calculated, greater than the abnormal threshold (e.g. mean minus two times standard deviation). Files which fall between this and the main threshold are not blocked, but their presence is noted so that further inspection may be carried out in future, and explicit viral signatures developed to match them should they turn out to be exploits.

More elaborate threshold schemes, expressed in terms of multiples of standard deviation, may be developed at the discretion of the implementer to implement more complex or granular policies.

CONCLUSION

So in short, as will be apparent from the discussion above, embodiments of the invention typically comprise:

1. (Optionally) Segmenting a file;
2. Representing a file as a sequence of integers, according to an appropriate encoding scheme;
3. Constructing a hidden Markov Model with one or two hidden Markov chains using the techniques;
4. Estimating the posterior distribution of the model using a sequence of training files, none of which are infected, using standard methods known to those skilled in the art, as for example described in [Ghahramani 1997], or in the case of a single Markov-chain, the Expectation Maximisation algorithm;
5. Representing the emission distribution as:
   (a) A Mixture of Gaussians ("MoG") model;
   (b) A simple table of probability values for each observable;
   (c) A sparse table of probability values for common observables, with less common observables being assigned the remainder of the probability mass uniformly; or
   (d) A function inferred a posteriori by functional approximation schemes such as neural networks, support-vector regression or relevance-vector regression using appropriate step-functions or kernels as appropriate;
6. Using the generated models (one for each segment, for each file-type) to classify files as normal or abnormal.

REFERENCES

[1] Arnold, W. C., Chess, D. M., Kephart, J. O., White, S. R., and IBM. Automatic immune system for computers and computer networks, 1996. U.S. Pat. No. 5,440,723.

[2] Brand, M. E., and Misubishi. Method for minimizing entropy in hidden markov models of physical signals, 2001. U.S. Pat. No. 6,212,510.

[3] Chen, C.-H., Luo, C.-K., and Corp., C. S. I. S. Anti-virus agent for use with databases and mail servers, 1998. U.S. Pat. No. 5,832,208.

[4] Chess, D. M., Kephart, J. O., Sorkin, G. B., and IBM. Automatic analysis of a computer virus structure and means of attachment to, 1996. U.S. Pat. No. 5,485,575.

[5] Chi, D., and Symantec. Generic detection and elimination of marco viruses, 2006. U.S. Pat. No. 7,089,591.

[6] Elgressy, D., Jospe, A., and Think, C. A. Method and system for preventing the downloading and execution of executable object, 2002. U.S. Pat. No. 6,449,723.

[7] Grupe, R. R., and McAfee. Intelligent network scanning system and method, 2005. U.S. Pat. No. 6,981,280.

[8] Hile, J. K., Gray, M. H., and Wakelin, D. L. In transit detection of computer virus with safeguard, 1994. U.S. Pat. No. 5,319,776.

[9] Ji, S., Chen, E., and Micro, T. Virus detection and removal apparatus for computer networks, 1997. U.S. Pat. No. 5,623,600.

[10] Ji, S., and Micro, T. Computer network malicious code scanner, 1999. U.S. Pat. No. 5,983,348.

[11] Kephart, J. O., Sorkin, G. B., Tesauro, G. J., White, S. R., and IBM. Adaptive statistical regression and classification of data strings, with application to the generic detection of c. viru, 1997. U.S. Pat. No. 5,675,711.

[12] Kouznetsov, V., Ushakov, A., and Associates, N. System and method for efficiently managing computer virus definitions using a structured virus database, 2003. U.S. Pat. No. 6,622,150.

[13] Lentz, S. A. System and method of protecting integrity of computer data and software, 1990. U.S. Pat. No. 4,975,950.

[14] Nachenberg, C., and Symantec. Polymorphic virus detection module, 1997. U.S. Pat. No. 5,696,822.

[15] Nachenberg, C., and Symantec. Polymorphic virus detection module, 1998. U.S. Pat. No. 5,826,013.

[16] Nachenberg, C., and Symantec. Antivirus accelerator, 2000. U.S. Pat. No. 6,021,510.

[17] Nachenberg, C., and Symantec. Data driven detection of viruses, 2005. U.S. Pat. No. 6,851,057.

[18] Nachenberg, C., and Symantec. Signature driven cache extension for stream based scanning, 2006. U.S. Pat. No. 7,130,981.

[19] Nefian, A. V., and Intel. Factorial hidden markov model for audiovisual speech recognition, 2007. U.S. Pat. No. 7,209,883.

[20] Perelson, A. S., Forrest, S., and Allen, L. C. Method of detecting changes to a collection of digital signals, 1995. U.S. Pat. No. 5,448,668.

[21] Rowland, C. H., and Psionic Software. Intrusion detection system, 2002. U.S. Pat. No. 6,405,318.

[22] Shieh, S.-P. W., Gligor, V. D., and IBM. Pattern-oriented intrusion-detection system and method, 1994. U.S. Pat. No. 5,278,901.

[23] Shostack, A., Allouch, D., and Netect. Computer security, 2001. U.S. Pat. No. 6,298,445.

[24] Vaidya, V., and Internet Tools. Dynamic signature inspection-based network intrusion detection, 2001. U.S. Pat. No. 6,279,113.

REFERENCED PAPERS

[25] Philip K. Chan, Matthew V. Mallony, and Muhammad H. Arshad. A machine learning approach to anomaly detection. Technical report, Florida Institute of Technology, March 2003.

[26] Zoubin Ghahramani and Michael I. Jordan. Factorial hidden markov models. Machine Learning, 29:245-273, 1997.

[27] Shashank Gonchigar and Bojan Zdrnja. Ani vulnerability: History repeats, 2007.

[28] Daniel S. Hirschberg. Algorithms for the longest common subsequence problem. J. ACM, 24(4):664-675, 1977.

[29] Art Munson and Rich Carunana. Cluster ensembles for network anomaly detection. In North Easy Student Colloquium on Arti_cial Intelligence (NESCAI), 2006.

[30] L. Rabiner and B. Juang. An introduction to hidden Markov models. ASSP Magazine, IEEE [see also IEEE Signal Processing Magazine], 3(1 Part 1):4-16, 1986

The invention claimed is:

1. A method comprising:
receiving a file comprising a plurality of micro-files embedded in the file;
segmenting the file into two or more segments by extracting the micro-files, wherein each of the micro-files is a logical segment of the file;
comparing at least one initial byte sequence of each segment with a plurality of reference byte sequences, each reference byte sequence corresponding to at least one of a plurality of file types;
identifying a short list of a plurality of possible file types that indicate possible classifications of each of the segments using a heuristic file type detection based on the comparison of the initial byte sequence to the reference byte sequences, the short list containing fewer possible file types than a total number of the plurality of file types with corresponding reference byte sequences;
comparing each of the segments of the file to corresponding logical segments of one or more predetermined models of normal file types, wherein the predetermined models correspond to the possible file types in the short list and are derived using one or more character patterns for correlation sequences associated with the normal file types;
generating probability values for each segment indicating a probability of each segment being one of a particular file type in the short list based on the comparing each of the segments of the file to the corresponding logical segments;
based on the probability values, determining whether or not the received file comprises any segment corresponding to any of the one or more predetermined models of normal file types;
if the received file comprises any segment that does not correspond to any of the one or more predetermined models of normal file types, flagging the received file as a potential exploit; and
if all of the segments of the received file correspond to one of the predetermined models of normal file types, flagging the received file as normal.

2. A method according to claim 1, wherein the one or more of the file segments are modeled as a sequence of integer values.

3. A method according to claim 1, wherein the structure governing each file segment's content is inferred by a machine learning system.

4. A method according to claim 1, wherein the modeled file types comprise non-executable file types.

5. A method according to claim 1, wherein the models of normal file type segments are probabilistic models, wherein output from the determining is a probability that a given segment of the received file is of a given normal file type.

6. A method according to claim 5, wherein the determining comprises comparing the output probability that a given segment of the received file is of a given type with a threshold probability.

7. A method according to claim 6, wherein the threshold probability is specific to a given model is determined based on the probabilities output by the model for a corpus of normal files.

8. A method according to any claim 1, wherein the models of normal file type segments are Markov models.

9. A method according to claim 1, wherein the file types are included in the short list of possible file types based on one or more of: file name extension; file mime-type; and file content of the received file.

10. A method according to claim 1, wherein the flagging the received file as a potential exploit comprises flagging the file as a possible exploit or a definite exploit.

11. A method according to claim 1, wherein a result of the determining is used to control subsequent access to the received file.

12. A system comprising:
   a memory for receiving a file comprising a plurality of micro-files embedded in the file;
   one or more databases storing a plurality of normal file models; and
   a processor, the processor being operable to:
      segment the file into two or more segments by extracting the micro-files, wherein each of the micro-files is a logical segment of the file;
      compare at least one initial byte sequence of each segment with a plurality of reference byte sequences, each reference byte sequence corresponding to at least one of a plurality of file types;
      identify a short list of possible file types that indicate possible classifications of each of the segments using a heuristic file type detection based on the comparison of the initial byte sequence to the reference byte sequences, the short list containing fewer possible file types than a total number of the plurality of file types with corresponding reference byte sequences;
      compare each of the segments of the file to corresponding logical segments of one or more predetermined models of normal file types, wherein the predetermined models correspond to the possible file types in the short list and are derived using one or more character patterns for correlation sequences associated with the normal file types;
      generate probability values for each segment indicating a probability of each segment being one of a particular file type in the short list based on the comparison of each of the segments of the file to the corresponding logical segments;
      determine, based on the probability values, whether or not a file received in the memory comprises any segment corresponding to any of the one or more predetermined models of normal file types stored in the database;
      if the received file comprises any segment that does not correspond to any of the one or more predetermined models of normal file types, flag the received file as a potential exploit; and
      if all of the segments of the received file correspond to one of the predetermined models of normal file types, flagging the received file as normal.

13. A system according to claim 12, wherein the processor is operable to flag the received file as normal, a possible exploit or a definite exploit.

14. A system according to claim 12, wherein the system is operable to control access to the received file based on the flag applied to the received file.

15. A system according to claim 12, wherein the system is operable as an intrusion detecting system, a virus filtering application or a virus scanning application.

16. A non-transitory computer program storage product comprising computer program code that when installed and executed on a computer or computer system causes the computer or computer system to:
   receive a file comprising a plurality of micro-files embedded in the file;
   segment the file into two or more segments by extracting the micro-files, wherein each of the micro-files is a logical segment of the file;
   compare at least one initial byte sequence of each segment with a plurality of reference byte sequences, each reference byte sequence corresponding to at least one of a plurality of file types;
   identify a short list of possible file types that indicate possible classifications of each of the segments using a heuristic file type detection based on the comparison of the initial byte sequence to the reference byte sequences, the short list containing fewer possible file types than a total number of the plurality of file types with corresponding reference byte sequences;
   compare each of the segments of the file to corresponding logical segments of one or more predetermined models of normal file types, wherein the predetermined models correspond to the possible file types in the short list and are derived using one or more character patterns for correlation sequences associated with the normal file types;
   generate probability values for each segment indicating a probability of each segment being one of a particular file type in the short list based on the comparison of each of the segments of the file to the corresponding logical segments;
   determine, based on the probability values, whether or not a file received in the memory comprises any segment corresponding to any of the one or more predetermined models of normal file types;
   if the received file comprises any segment that does not correspond to any of the one or more predetermined models of normal file types, flag the received file as a potential exploit; and
   if all of the segments of the received file correspond to one of the predetermined models of normal file types, flagging the received file as normal.

17. The non-transitory computer program storage product of claim 16, wherein the computer program code that causes the processor to determine comprises computer program code that causes the processor to compare the output probability that a given segment of the received file is of a given type with a threshold probability.

18. The non-transitory computer program storage product of claim 16, wherein the computer program code that causes the processor to flag the received file as a potential exploit comprises computer program code that causes the processor to flag the file as a possible exploit or a definite exploit.

* * * * *